US012572497B2

(12) United States Patent
Gopalakrishnan et al.

(10) Patent No.: US 12,572,497 B2
(45) Date of Patent: Mar. 10, 2026

(54) DETECTION OF A STUCK DATA LINE OF A SERIAL DATA BUS

(71) Applicant: MICROCHIP TECHNOLOGY INCORPORATED, Chandler, AZ (US)

(72) Inventors: Eshwar Gopalakrishnan, Chennai (IN); Robin Jonah Solomon, Chennai (IN); Anandakumar Vedanayagam, Chennai (IN); Vijayalakshmi Chelladurai, Chennai (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/514,639

(22) Filed: Nov. 20, 2023

(65) Prior Publication Data

US 2024/0419623 A1 Dec. 19, 2024

(30) Foreign Application Priority Data

Jun. 16, 2023 (IN) .............................. 202341041041

(51) Int. Cl.
G06F 13/42 (2006.01)
(52) U.S. Cl.
CPC .. G06F 13/4282 (2013.01); *G06F 2213/0002* (2013.01)
(58) Field of Classification Search
None
See application file for complete search history.

(56) References Cited

U.S. PATENT DOCUMENTS

| | | | | |
|---|---|---|---|---|
| 2007/0240019 A1* | 10/2007 | Brady | ................. | G06F 13/4291 |
| | | | | 710/110 |
| 2010/0223486 A1* | 9/2010 | Deshpande | ............... | G06F 1/08 |
| | | | | 713/400 |
| 2014/0310436 A1* | 10/2014 | Du | ........................ | G06F 13/362 |
| | | | | 710/110 |
| 2016/0085614 A1* | 3/2016 | Aldereguia | ........... | H04L 1/1607 |
| | | | | 714/801 |
| 2022/0391346 A1* | 12/2022 | Mizutani | ............. | G06F 13/4282 |
| 2024/0111619 A1* | 4/2024 | Tao | ..................... | G06F 11/0745 |

OTHER PUBLICATIONS

"Specification for I3C", MIPI Alliance, Inc., Version 1.1.1, including Errata 01 and Errata 02, Mar. 2022, pp. 1-576.
"Management Component Transport Protocol (MCTP) I3C Transport Binding Specification", DMTF, 2021, pp. 1-33.

* cited by examiner

*Primary Examiner* — Farley Abad
*Assistant Examiner* — Dayton Lewis-Taylor
(74) *Attorney, Agent, or Firm* — Shumaker, Loop & Kendrick, LLP; Ryan M. Corbett

(57) ABSTRACT

A controller is provided that includes a serial data (SDA) line interface to connect the controller to an SDA line of a two-wire, shared, serial data bus. The controller includes processing circuitry to sample the SDA line to obtain samples of a voltage level on the SDA line, and monitor the samples. The processing circuitry detects a predetermined number of consecutive ones of the monitored samples at a low voltage level, without a low-to-high transition in the voltage level. The processing circuitry indicates a stuck SDA condition based on the detected, predetermined number of consecutive ones of the monitored samples.

22 Claims, 7 Drawing Sheets

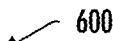

600

602 — | SAMPLE A SERIAL DATA (SDA) LINE OF A TWO-WIRE, SHARED, SERIAL DATA BUS TO OBTAIN SAMPLES OF A VOLTAGE LEVEL ON THE SDA LINE

604 — | MONITOR THE SAMPLES

606 — | DETECT A PREDETERMINED NUMBER OF CONSECUTIVE ONES OF THE MONITORED SAMPLES AT A LOW VOLTAGE LEVEL, WITHOUT A LOW-TO-HIGH TRANSITION IN THE VOLTAGE LEVEL

608 — | INDICATE A STUCK SDA CONDITION BASED ON THE DETECTED, PREDETERMINED NUMBER OF CONSECUTIVE ONES OF THE MONITORED SAMPLES

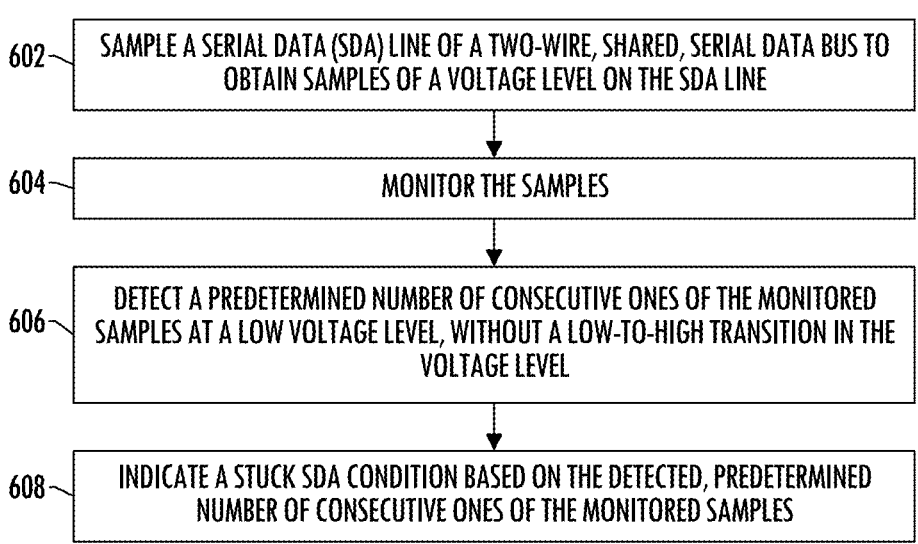

FIG. 6A

610 — | FILTER OUT NOISE IN THE VOLTAGE LEVEL ON THE SDA LINE

602

| SAMPLE THE SDA LINE FROM THE FILTERED VOLTAGE LEVEL

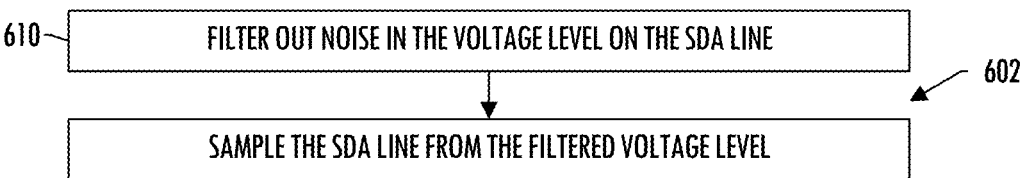

FIG. 6B

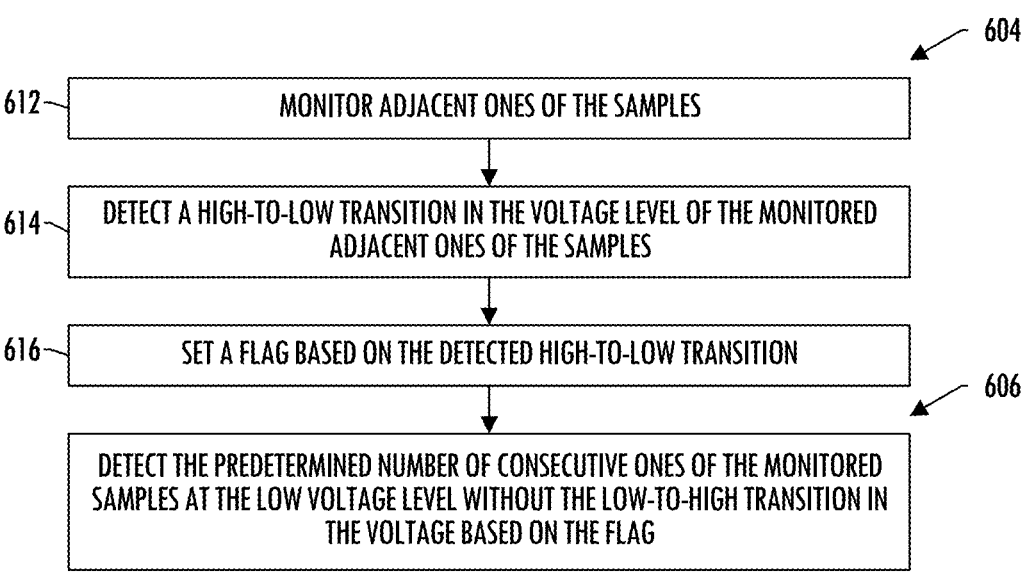
FIG. 6C
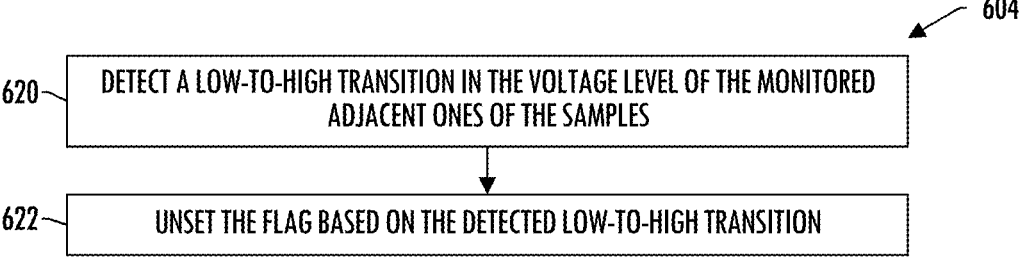
FIG. 6D
DETECT A LOW-TO-HIGH TRANSITION IN THE VOLTAGE LEVEL OF THE MONITORED ADJACENT ONES OF THE SAMPLES
UNSET THE FLAG BASED ON THE DETECTED LOW-TO-HIGH TRANSITION
FIG. 6E 624 — | HOLD THE FLAG UNSET FOR CONSECUTIVE ONES OF THE MONITORED SAMPLES AT THE HIGH VOLTAGE LEVEL, AFTER THE FLAG HAS BEEN UNSET BASED ON THE DETECTED LOW-TO-HIGH TRANSITION |

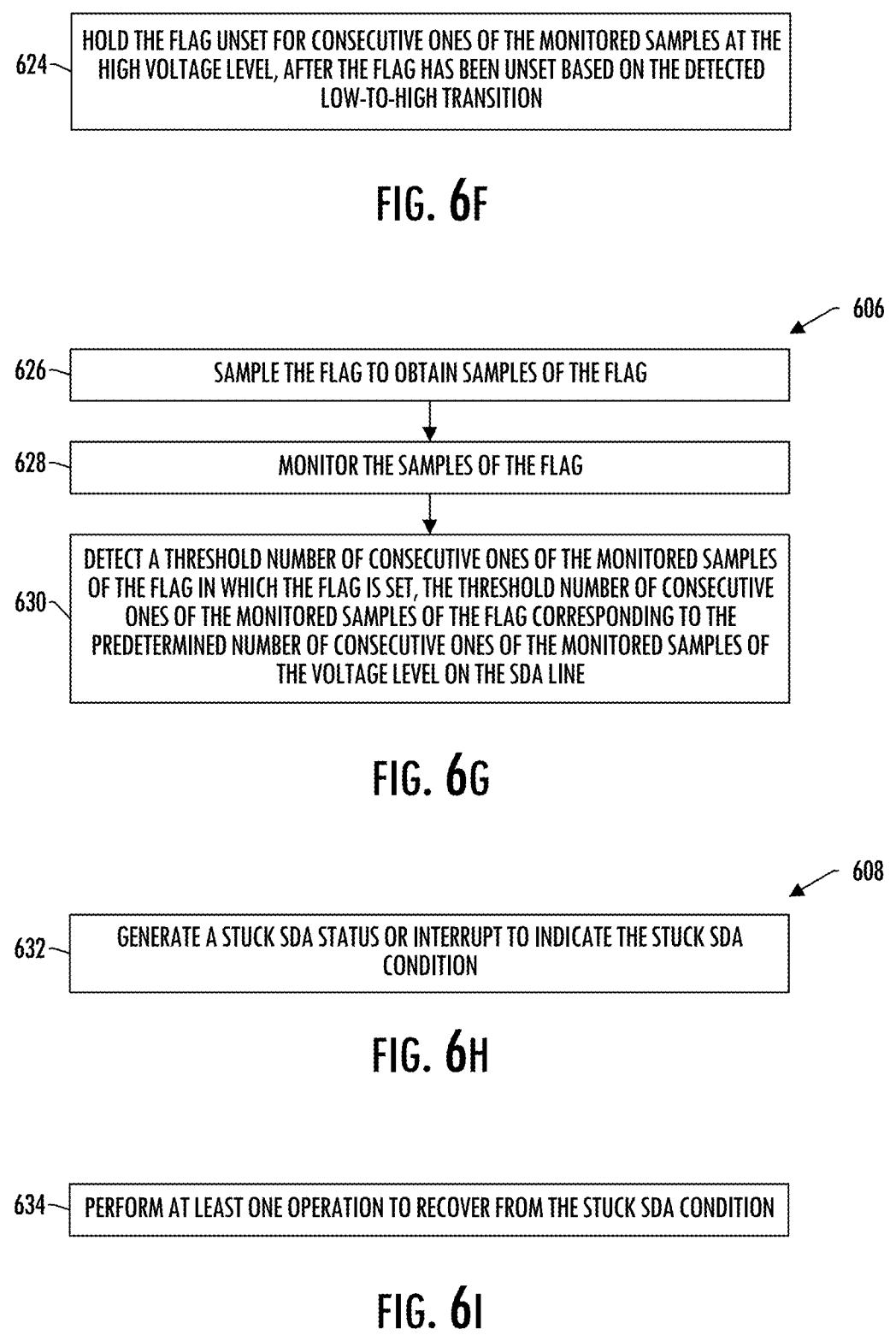

626 — | SAMPLE THE FLAG TO OBTAIN SAMPLES OF THE FLAG |

628 — | MONITOR THE SAMPLES OF THE FLAG |

630 — | DETECT A THRESHOLD NUMBER OF CONSECUTIVE ONES OF THE MONITORED SAMPLES OF THE FLAG IN WHICH THE FLAG IS SET, THE THRESHOLD NUMBER OF CONSECUTIVE ONES OF THE MONITORED SAMPLES OF THE FLAG CORRESPONDING TO THE PREDETERMINED NUMBER OF CONSECUTIVE ONES OF THE MONITORED SAMPLES OF THE VOLTAGE LEVEL ON THE SDA LINE |

632 — | GENERATE A STUCK SDA STATUS OR INTERRUPT TO INDICATE THE STUCK SDA CONDITION |

FIG. 6H

634 — | PERFORM AT LEAST ONE OPERATION TO RECOVER FROM THE STUCK SDA CONDITION |

FIG. 6I

DETECTION OF A STUCK DATA LINE OF A SERIAL DATA BUS

CROSS-REFERENCE TO RELATED APPLICATION(S)

The present application claims priority to Indian Provisional Patent Application No. 202341041041, entitled: Detection of a Stuck Data Line of a Serial Data Bus, filed on Jun. 16, 2023, the content of which is hereby incorporated by reference in its entirety.

TECHNOLOGICAL FIELD

The present disclosure relates generally to serial communication and, in particular, to detection of a stuck data line of a serial data bus.

BACKGROUND

Serial communication has played a significant role in facilitating inter-chip communication within electronic systems. It involves the transmission of data sequentially, bit by bit, over a communication link between devices. This approach offers advantages such as simplicity, low pin count, and the ability to transmit data over longer distances compared to parallel communication.

One popular serial communication protocol is I2C (Inter-Integrated Circuit), which was developed by Philips Semiconductor (now NXP Semiconductors) in the early 1980s. I2C is a two-wire bus protocol that allows multiple devices to communicate with each other using a shared serial data (SDA) line and serial clock (SCL) line. It supports a controller-target (master-slave) architecture where a controller device initiates and controls communication, and target devices respond to the controller's commands or requests. I2C is commonly used for connecting various devices in embedded systems, consumer electronics, and computer peripherals.

As technology advanced and the need for higher data transfer rates, increased flexibility, and improved power efficiency emerged, the MIPI Alliance developed I3C (Improved Inter-Integrated Circuit). Introduced in 2017, I3C builds upon the strengths of I2C while offering enhancements and additional features. I3C is backward compatible with I2C, allowing I2C devices to coexist on the same data bus. It introduces higher data transfer rates, increased flexibility for connecting multiple devices, multi-controller support, hot-join capability, dynamic address assignment, in-band interrupts, and other improvements. I3C has gained popularity in applications such as smartphones, tablets, Internet of Things (IoT) devices, and automotive systems.

Serial communication protocols like I2C and I3C have become integral to inter-chip communication within electronic systems. They enable devices to exchange data, commands, and control signals efficiently and reliably. These protocols have been widely adopted and standardized, allowing for interoperability between devices from different manufacturers and simplifying the integration of various components within electronic systems. The continued evolution and development of serial communication protocols contribute to the advancement of inter-chip communication and the seamless operation of modern electronic devices.

BRIEF SUMMARY

In I3C, the SDA and SCL lines are expected to be pulled high by the controller during bus idle under normal functioning of the data bus. A stuck SDA condition may occur, however, if during read/write transaction, a target on the data bus has for some reason driven the SDA line low for a period of time without releasing the SDA line, despite the controller providing clocks by toggling the SCL line. The stuck SDA condition may be a deterrent to further communication by the controller to the target over the data bus. The controller may therefore have a need to detect the stuck SDA condition, which may then cause the controller to implement a recovery method to recover from the stuck SDA condition.

Example implementations of the present disclosure therefore relate to detection of a stuck data line of a data bus for serial communication, such as an I3C data bus. The present disclosure includes, without limitation, the following example implementations.

Some example implementations provide a controller comprising: a serial data (SDA) line interface to connect the controller to an SDA line of a two-wire, shared, serial data bus; and processing circuitry to at least: sample the SDA line to obtain samples of a voltage level on the SDA line; monitor the samples; detect a predetermined number of consecutive ones of the monitored samples at a low voltage level, without a low-to-high transition in the voltage level; and indicate a stuck SDA condition based on the detected, predetermined number of consecutive ones of the monitored samples.

Some example implementations provide a method comprising: sampling a serial data (SDA) line of a two-wire, shared, serial data bus to obtain samples of a voltage level on the SDA line; monitoring the samples; detecting a predetermined number of consecutive ones of the monitored samples at a low voltage level, without a low-to-high transition in the voltage level; and indicating a stuck SDA condition based on the detected, predetermined number of consecutive ones of the monitored samples.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 6A, 6B, 6C, 6D, 6E, 6F, 6G, 6H and 6I are flowcharts illustrating various steps in a method according to various example implementations.

DETAILED DESCRIPTION

Figure 1:
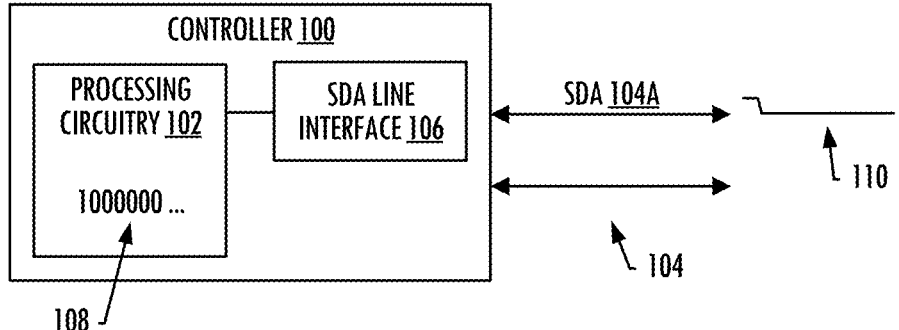
FIG. 1 illustrates a controller according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Further, reference may be made herein to terms specific to a particular system or architecture, but it should be understood that example implementations of the present disclosure may be equally applicable to any of a number of systems and architectures. In this regard, some example implementations may be described in the context of serial communication standards for inter-chip communication such as I3C and its predecessor, I2C. It should be understood, however, that example implementations may be equally applicable to other serial communication standards.

Example implementations of the present disclosure relate generally to serial communication and, in particular, to detection of a stuck data line of a serial data bus.

FIG. 1 illustrates a controller 100 according to some example implementations of the present disclosure. The controller may be an electronic device, such as an integrated circuit (IC). The controller includes processing circuitry 102, such as a general or specific-purpose processor, microprocessor, controller, or microcontroller, without limitation. The controller may also include one or more interfaces to connect the controller to a data bus over which the controller may communicate with other electronic devices. In the context of serial communication standards such as I2C and I3C, the data bus may be a two-wire, shared, serial data bus 104. In this regard, the data bus may include a serial data (SDA) line 104A used for transmitting and receiving data between electronic devices connected to the data bus, and the controller may include an SDA line interface 106 to connect the controller to the SDA line 104A.

Figure 2:
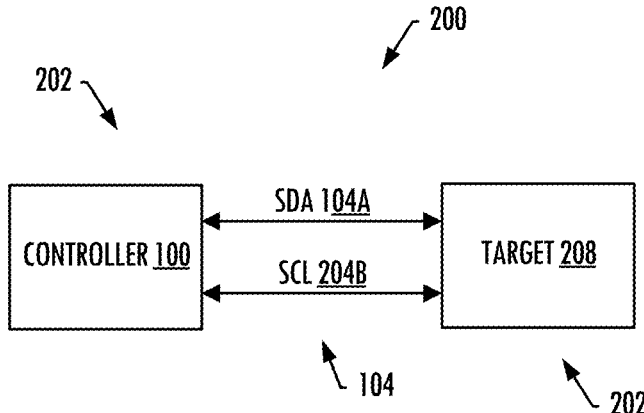
FIG. 2 illustrates a system including the controller of FIG. 1, according to some example implementations.

FIG. 2 illustrates a system 200 that includes the controller 100, according to some example implementations of the present disclosure. As shown, the system includes a number of electronic devices 202 such as ICs that are connected to the data bus 104. In addition to the SDA line 104A, the data bus may include an SCL line 204B that provides a clock signal used to synchronize data transfer between the electronic devices. In some examples, then, the controller may also include an SCL line interface (not shown) to connect the controller 100 to the SCL line 204B.

The system 200 may operate according to a controller-target architecture in which an electronic device 202 may function as the controller 100 that initiates and controls communication on the data bus 104 (timing and data), and another electronic device 202 may function as a target 208 that responds to commands or requests from the controller. In some examples, the system may support multiple controllers and targets.

Figure 3:
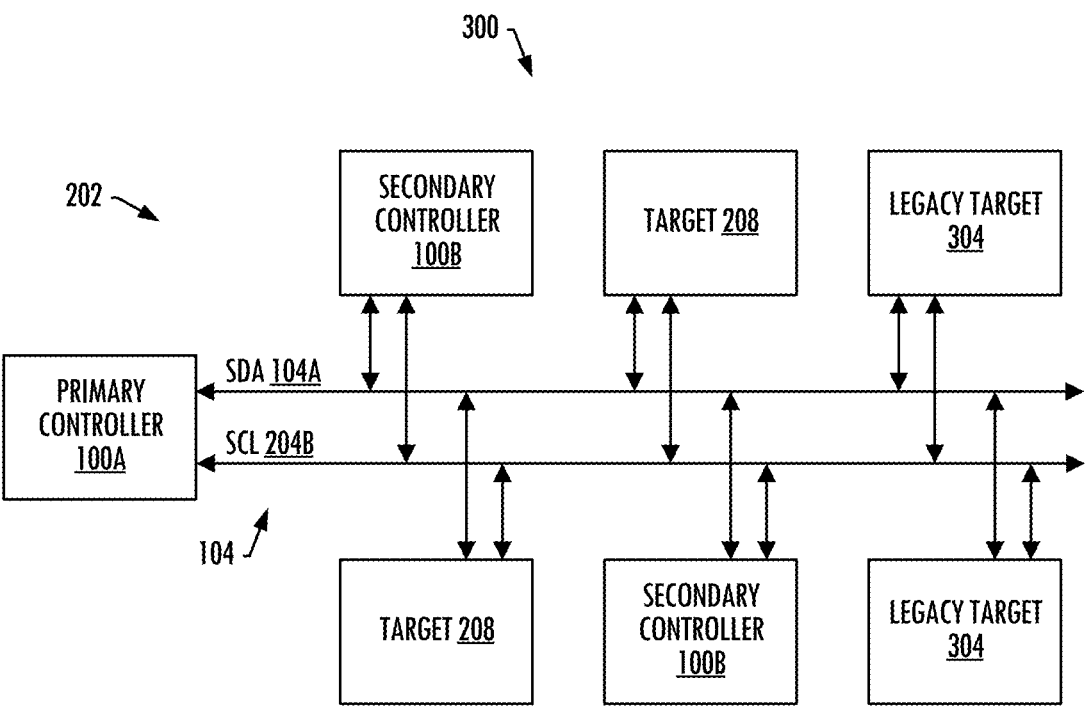
FIG. 3 illustrates a system that may correspond to the system of FIG. 2, including multiple controllers and targets, according to some example implementations.

FIG. 3 illustrates a system 300 that may correspond to the system 200 of FIG. 2, including multiple controllers and targets, according to some example implementations. As shown, for example, the system 300 may include a primary controller 100A and one or more secondary controllers 100B, any one of which may be an active controller at any point in time that is currently in control of the data bus 104. The primary controller 100A may initialize the data bus 104 and perform configuration of the targets 208. The primary controller 100A may act as the authority for the data bus 104 in its initial state, and become the first active controller once the data bus is configured. The secondary controller 100B may initially function as a target, but the secondary controller 100B can accept controller-ship from the active controller and become the new active controller. In the context of I3C, the system may include an I3C primary controller 100A and one or more I3C secondary controllers 100B.

The system 300 may likewise include one or more targets 208. The system may also include one or more legacy targets 304 from an earlier communication standard with which the system 300 may be compatible. Again, in the context of I3C, the system may include one or more I3C targets 208, and the system may include one or more I2C targets 304.

Returning to FIG. 2, the system 200 may support multiple data transfer modes, allowing the electronic devices 202 to communicate at different speeds based on their capabilities. The modes may include a single data rate (SDR) mode and a number of high data rate (HDR) modes, with increasing data transfer rates and corresponding signal integrity requirements. The SDR mode in particular may be used for a number of purposes, such as to perform private messaging from the controller 100 to the target 208, and to enter other modes and states (e.g., HDR modes). In the context of I3C, the SDR mode may be used to implement built-in I3C features such as common command codes (CCCs), in-band interrupt (IBI), and hot-join. The SDR mode may also be used to transition from I2C to I3C through dynamic address assignment, as well as to perform legacy I2C transactions on the data bus 104.

The electronic devices 202 may operate in various output modes to drive signals on the data bus 104. Examples of suitable modes include an open-drain mode and a push-pull mode, which define how the electronic devices control the voltage levels on the SDA line 104A and the SCL line 204B. In open-drain mode, the electronic device may be configured at its output as an open drain or open collector. In the open-drain mode, the electronic device can pull the signal line (SDA or SCL) to a low voltage level (logic 0) by actively sinking current, while an external pull-up resistor may be used to pull the line to the high voltage level (logic 1). In push-pull mode, the electronic device may be configured at its output as a push-pull driver. In the push-pull mode, the electronic device can actively drive both high (logic 1) and low (logic 0) voltage levels on the signal line.

Figure 4A:
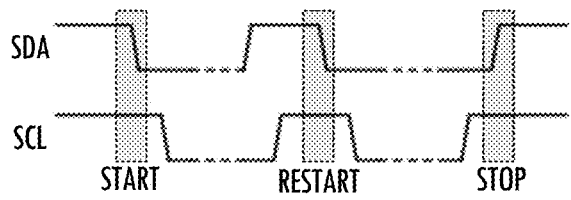
FIGS. 4A, 4B and 4C are timing diagrams of signals on lines of a data bus of the system of FIG. 2 for a transaction on the data bus, including to specify start, stop and restart conditions (FIG. 4A), an address header (FIG. 4B), and a data word (FIG. 4C), according to some example implementations.
Figure 4B:
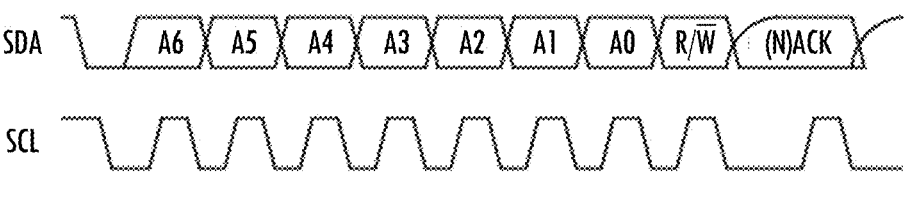
Figure 4C:
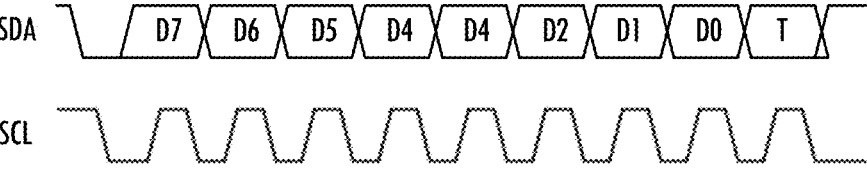

FIGS. 4A, 4B and 4C are timing diagrams of signals on the SDA line 104A and the SCL line 204B for a read/write transaction on the data bus 104, according to some example implementations. As shown in FIG. 4A, read/write transactions on the data bus may begin with a start condition, which may asserted by the controller 100 and implemented as a high-to-low transition on the SDA line 104A while the SCL line 204B is at a constant high. Likewise, read/write transactions on the data bus may end with a stop condition asserted by the controller. A stop condition may be implemented as a low-to-high transition on the SDA line 104A while the SCL line 204B is at a constant high. As an alternative to the stop condition, a restart condition may allow multiple messages to be sent while in the same frame without needing to transmit a stop and start in between messages. A restart condition may look the same as a start condition on the data bus 104.

Following a start/restart condition, a read/write transaction on the data bus 104 may include an address header, which may include a destination address, indicate a read or write transaction, and provide an acknowledgement. The address header may be transmitted on the SDA line 104A during periods when the SCL line 204B is transitioning from low to high (rising edge) or from high to low (falling edge). FIG. 4B is a timing diagram of the SDA line 104A and the SCL line 204B for an address header (in push-pull mode), according to some example implementations. In the context of I2C and I3C, the address header may include seven address bits, illustrated as A6, A5 . . . . A0, one read/write (R/W) bit, and one acknowledge (ACK)/non-acknowledge (NACK) bit. In the context of I3C, the R/W bit may be referred to as a R/$\overline{W}$ bit or a RnW bit. In some examples, the controller 100 may transmit the address and R/W bits. The controller 100 may use the address bits to address the target 208, and the controller 100 may use the R/W bit to specify a write mode (the controller writing to the target) or a read mode (the controller reading from the target). In this regard, the controller may transmit a low signal on SDA line 104A (R/W bit=0) to represent the write mode, or a high signal on SDA line (R/W bit=1) to represent the read mode.

Once the controller 100 transmits the address and R/W bits of the address header on the data bus 104, the controller may wait for the target 208 to acknowledge (or not acknowledge) the request. This may be done through the ACK/NACK bit in the address header. The target may pull the SDA line 104A low (ACK/NACK bit=0) to respond with an acknowledge (ACK), or release the SDA line high (ACK/NACK bit=1) to respond with a non-acknowledge (NACK).

One or more data words may follow the address header, illustrated as D7, D6 . . . . D0, as shown in FIG. 4C. Similar to the address header, the data words may be transmitted on the SDA line 104A during periods when the SCL line 204B is transitioning from low to high (rising edge) or from high to low (falling edge). In the context of I3C, a data word may be nine bits wide, including eight-bit data and a ninth, transition bit (T-bit). When the controller 100 is writing data to the target 208, the T-bit of each data word may be a parity bit calculated using odd parity, which is helpful in detecting noise-caused errors on the data bus. Conversely, when the controller 100 is reading data returned from the target 208, the T-bit of each data word may represent an end-of-data bit. To end the message, the target may return the T-Bit as '0'. To continue the message, the target 208 may return the T-Bit as '1' and monitor the SDA line 104A. If the SDA line 104A remains high on the next falling SCL edge, the target 208 may continue to send the next data value. If the SDA line 204B is low on the next falling SCL edge (restart), then the controller 100 has aborted the data transfer, and the target 208 does not send further data.

The electronic devices 202 may implement one or more error detection and recovery methods to handle various error conditions during read/write transactions on the data bus 104. In this regard, in the context of I3C, a possible error condition exists where a target 208 that is driving the SDA line 104A of the data bus 104 could continue driving the SDA line 104A even when the controller 100 expects the SDA line 104A to be released. This error condition can happen, for example, during a read transaction or an acknowledge (ACK) due to a missed clock cycle. In the *Management Component Transport Protocol (MCTP) I3C Transport Binding Specification* (DSP0233), published by the Distributed Management Task Force (DMTF), this error condition is referred to as a "stuck SDA" condition.

According to some example implementations of the present disclosure, the controller 100 may detect a stuck SDA condition during a read/write transaction on the data bus 104, and implement a recovery method to recover from the stuck SDA condition. In some examples, the stuck SDA condition may be characterized as the target 208 maintaining the SDA line 104A at the low voltage level (logic 0). To detect a stuck SDA condition during a read/write transaction, then, controller 100 may obtain samples of the voltage level on the SDA line 104A, and monitor the samples to detect a predetermined number of consecutive ones of the samples at a low voltage level, without a low-to-high (rising edge) transition in the voltage level, i.e., the SDA line 104A being constant low, which indicates a stuck SDA condition.

As shown in FIG. 1, for example, the processing circuitry 102 of the controller 100 may sample the SDA line 104A to obtain samples 108 of a voltage level 110 on the SDA line 104, and monitor the samples 108. In some examples, the processing circuitry 102 may filter out noise in the voltage level on the SDA line 104A, and the voltage level 110 may be sampled from the filtered voltage level. The processing circuitry 102 may detect a predetermined number of consecutive ones of the monitored samples at a low voltage level, without a low-to-high transition in the voltage level.

The processing circuitry 102 may indicate a stuck SDA condition based on the detected, predetermined number of consecutive ones of the monitored samples, such as by generation of a stuck SDA status or interrupt to indicate the stuck SDA condition. The processing circuitry 102 may then perform at least one operation to recover from the stuck SDA condition.

In some examples, the processing circuitry 102 may monitor adjacent ones of the samples 108, and detect a high-to-low (falling edge) transition in the voltage level 110 of the monitored adjacent ones of the samples. In some of these examples, the processing circuitry 102 may set a flag based on the detected high-to-low transition, and hold the flag set for consecutive ones of the monitored samples at the low voltage level. Likewise, the processing circuitry 102 may detect a low-to-high (rising edge) transition in the voltage level of the monitored adjacent ones of the samples, and unset the flag based on the detected low-to-high transition, and hold the flag unset for consecutive ones of the monitored samples at the high voltage level. The term "set" and "unset" are meant to be predefined different states of one or more bits, without limitation as to whether set indicates a "1" state or a "0" state.

In some examples, the processing circuitry 102 may detect the predetermined number of consecutive ones of the monitored samples 108 at the low voltage level without the low-to-high transition (indicating a stuck SDA condition) based on the flag. In this regard, the processing circuitry 102 may sample the flag to obtain samples of the flag, and monitor the samples of the flag. The processing circuitry may then detect a threshold number of consecutive ones of the monitored samples of the flag in which the flag is set, where the threshold number of consecutive ones of the monitored samples of the flag corresponds to the predetermined number of consecutive ones of the monitored samples 108 of the voltage level 110 on the SDA line 104A.

In some examples in which the data bus 104 includes an SCL line 204B for a clock signal, the processing circuitry 102 may sample the flag over respective clock periods of a reference clock that has a frequency greater than, equal to, or less than the frequency of the clock signal on the SCL line 204B. Sampling the flag with the reference clock at a frequency less than the clock signal on the SCL line 204B may save power relative to sampling the flag at a frequency greater than or equal to the clock signal on the SCL line 204B. In some examples, the threshold number of consecutive ones of the monitored samples 108 of the flag may be expressed in a predetermined number of the clock periods that is set to equate to a predetermined period of time. In a more particular example in which the data bus 104 is an I3C data bus that includes a 12.5 MHz clock signal on the SCL line 204B, a 32 kHz reference clock may be used to save counter bits and power while detecting a 30 millisecond predetermined period of time without a rising edge transition.

Figure 5:
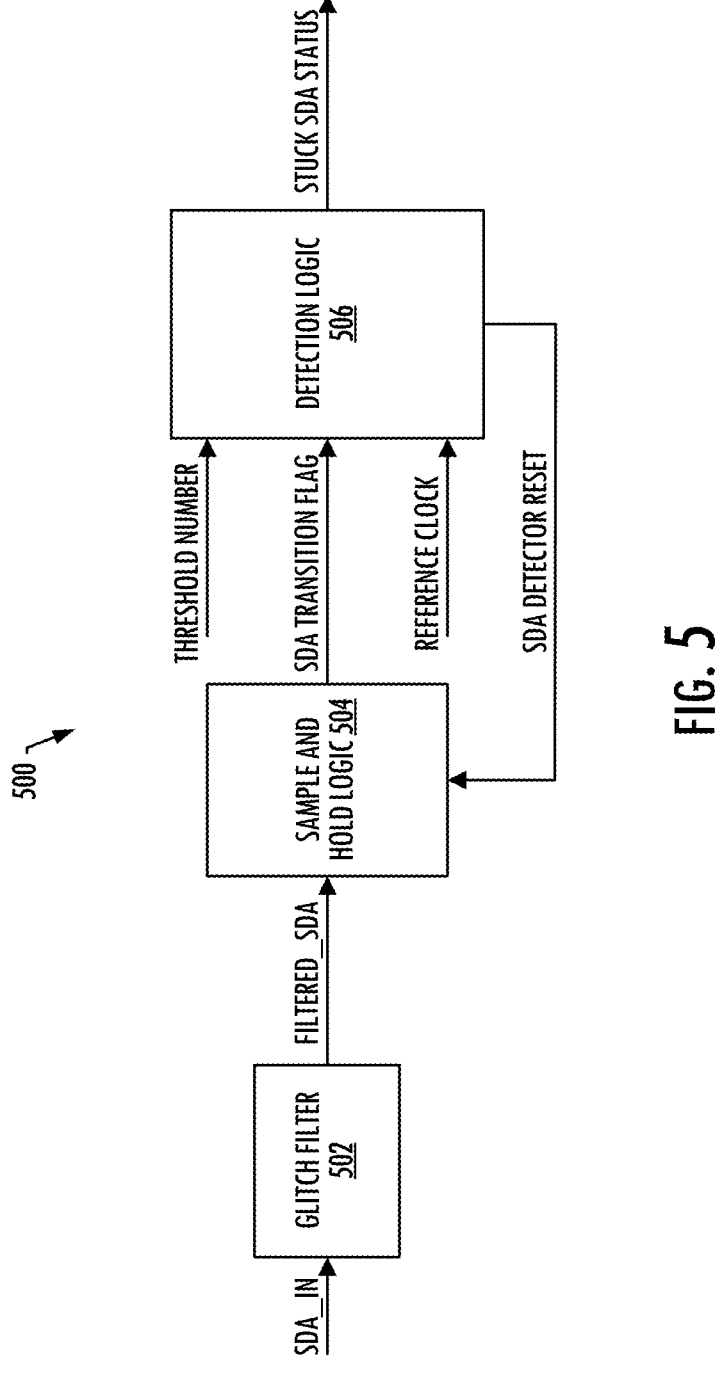
FIG. 5 is a functional block diagram of a detector for a stuck SDA condition, which may be implemented by the controller of FIG. 1, according to some example implementations.

To further illustrate some example implementations of the present disclosure, FIG. 5 is a functional block diagram of a detector 500 for a stuck SDA condition, which may be implemented by the controller 100 (e.g., processing circuitry 102). As shown, the detector includes a glitch filter 502, a sample and hold logic 504, and a detection logic 506. The glitch filter 502 (sometimes referred to as a spike filter) may receive an input from the SDA line 104A (SDA_IN), and filter out unwanted noise on the SDA line 104A to produce a filtered input (FILTERED_SDA). In this regard, the glitch filter may suppress high frequency voltage changes on the SDA line 104A.

The sample and hold logic 504 may asynchronously or synchronously sample the SDA line 104A to obtain samples of the voltage level on the SDA line 104A, as filtered by the glitch filter 502. The sample and hold logic 504 may monitor the samples, and flag any falling edge transitions in the voltage level. In some examples, the sample and hold logic may set a flag (referred to at times as an SDA transition flag) when a falling edge transition in the voltage level on the SDA line 104A is detected in the samples. Conversely, the sample and hold logic may unset the SDA transition flag to indicate when a rising edge transition in the voltage level on the SDA line is detected in the samples.

The detection logic 506 may sample the SDA transition flag at a reference clock frequency, thereby capturing any falling edge transitions in the voltage level on the SDA line 104A over one clock period of the reference clock. The detection logic 506 may count or otherwise keep track of a number of consecutive occurrences in which the SDA transition flag is set, and reset the count/number when the SDA transition flag is unset. As the detection logic 506 keeps track of the number of consecutive occurrences in which the SDA transition flag is set, the detection logic 506 may detect a stuck SDA condition when the number of consecutive occurrences in which the SDA transition flag is set reaches a threshold number of consecutive occurrences, which threshold number may be programmable. The detection logic 506 may then generate a stuck SDA status or interrupt to indicate a stuck SDA condition is encountered.

In some examples, the detection logic 506 may sample the SDA transition flag over respective clock periods of the reference clock. The reference clock may be set to a reference clock frequency that is greater than, equal to, or less than the frequency of the clock signal on the SCL line 204B. In some more specific examples, the reference clock frequency may be less than the frequency of the clock signal on the SCL line 204B. The threshold number (to which the number of consecutive occurrences in which the SDA transition flag is set is compared) may similarly be expressed in clock periods of the reference clock. In some examples, the threshold number may be programmed to a value in a range of one clock period up to a number of clock periods that equate to a predetermined period of time (e.g., 5 seconds).

In response to the stuck SDA status or interrupt, the controller 100 may implement a recovery method to recover. For example, the controller 100 may attempt the following sequence in SDR mode with an early exit as soon as the SDA line 104A goes high, followed by a stop condition. The controller 100 may drive one clock at a time (up to eight) on the SCL line 204B, which may cause the target 208 to drive SDA line 104A high for the ninth, T-bit. The controller may watch for the SDA line 104A going high, and in the case of a read transaction, stop the read by the driving SDA line 104A low when the SCL line 204B is high. In situations in which the above fails to recover from the stuck SDA condition, the controller 100 may hold the voltage level on the SCL line 204B (high or low) for some period of time (e.g., 150 μs). In some of these situations, the target 208 may implement a detector that determines if the SCL line 204B has not changed for at least some lesser amount of time (e.g., 200 μs or more), switch the target 208 interface to the SDA line 204B to high impedance (High-Z) to release the SDA line 104A, and wait for a restart or stop.

FIGS. 6A-6I are flowcharts illustrating various steps in a method 600 according to various example implementations. The method includes sampling a serial data (SDA) line of a two-wire, shared, serial data bus to obtain samples of a voltage level on the SDA line, as shown at block 602 of FIG. 6A. The method includes monitoring the samples, as shown at block 604. The method includes detecting a predetermined number of consecutive ones of the monitored samples at a low voltage level, without a low-to-high transition in the voltage level, as shown at block 606. And the method includes indicating a stuck SDA condition based on the detected, predetermined number of consecutive ones of the monitored samples, as shown at block 608.

In some examples, the method 600 includes filtering out noise in the voltage level on the SDA line, as shown at block 610 of FIG. 6B. In some of these examples, the SDA line is sampled at block 602 from the filtered voltage level.

In some examples, monitoring at block 604 the samples includes monitoring adjacent ones of the samples, as shown at block 612 of FIG. 6C. In some of these examples, the method 600 includes detecting a high-to-low transition in the voltage level of the monitored adjacent ones of the samples, and setting a flag based on the detected high-to-low transition, as shown at blocks 614 and 616. Also in some of these examples, the predetermined number of consecutive ones of the monitored samples at the low voltage level without the low-to-high transition in the voltage is detected at block 606 based on the flag.

In some of these examples, the method 600 includes holding the flag set for consecutive ones of the monitored samples at the low voltage level, after the flag has been set based on the detected high-to-low transition, as shown at block 618 of FIG. 6D.

In some examples, monitoring the samples at block 604 includes detecting a low-to-high transition in the voltage level of the monitored adjacent ones of the samples, as shown at block 620 of FIG. 6E. In some of these examples, monitoring the samples also includes unsetting the flag based on the detected low-to-high transition, as shown at block 622.

In some examples, the method 600 includes holding the flag unset for consecutive ones of the monitored samples at the high voltage level, after the flag has been unset based on the detected low-to-high transition, as shown at block 624 of FIG. 6F.

In some examples, detecting the predetermined number of consecutive ones of the monitored samples at the low voltage level without a low-to-high transition at block 606 includes sampling the flag to obtain samples of the flag, as shown at block 626 of FIG. 6G. The method 600 includes monitoring the samples of the flag, as shown at block 628. And the method includes detecting a threshold number of consecutive ones of the monitored samples of the flag in which the flag is set, the threshold number of consecutive ones of the monitored samples of the flag corresponding to the predetermined number of consecutive ones of the monitored samples of the voltage level on the SDA line, as shown at block 630.

In some examples, the two-wire, shared, serial data bus includes a serial clock (SCL) line for a clock signal, and the flag is sampled at block 626 over respective clock periods of a reference clock that has a frequency less than the frequency of the clock signal on the SCL line.

In some examples, the flag is sampled at block 626 over respective clock periods of a reference clock, and the threshold number of consecutive ones of the monitored samples of the flag is expressed in a predetermined number of the clock periods that is set to equate to a predetermined period of time.

In some examples, indicating the stuck SDA condition at block 608 includes generating a stuck SDA status or interrupt to indicate the stuck SDA condition, as shown at block 632 of FIG. 6G.

In some examples, the method 600 includes performing at least one operation to recover from the stuck SDA condition, as shown at block 634 of FIG. 6I.

As explained above and reiterated below, the present disclosure includes, without limitation, the following example implementations.

Clause 1. A controller comprising: a serial data (SDA) line interface to connect the controller to an SDA line of a two-wire, shared, serial data bus; and processing circuitry to at least: sample the SDA line to obtain samples of a voltage level on the SDA line; monitor the samples; detect a predetermined number of consecutive ones of the monitored samples at a low voltage level, without a low-to-high transition in the voltage level; and indicate a stuck SDA condition based on the detected, predetermined number of consecutive ones of the monitored samples.

Clause 2. The controller of clause 1, comprising the processing circuitry to filter out noise in the voltage level on the SDA line, and the SDA line is sampled from the filtered voltage level.

Clause 3. The controller of clause 1 or clause 2, wherein the processing circuitry to monitor the samples comprises the processing circuitry to: monitor adjacent ones of the samples; detect a high-to-low transition in the voltage level of the monitored adjacent ones of the samples; and set a flag based on the detected high-to-low transition, and wherein the predetermined number of consecutive ones of the monitored samples at the low voltage level without the low-to-high transition in the voltage is detected based on the flag.

Clause 4. The controller of clause 3, wherein the processing circuitry is to hold the flag set for consecutive ones of the monitored samples at the low voltage level.

Clause 5. The controller of clause 3 or clause 4, wherein the processing circuitry to monitor the samples comprises the processing circuitry to: detect a low-to-high transition in the voltage level of the monitored adjacent ones of the samples; and unset the flag based on the detected low-to-high transition.

Clause 6. The controller of clause 5, wherein the processing circuitry is to hold the flag unset for consecutive ones of the monitored samples at the high voltage level.

Clause 7. The controller of any of clauses 3 to 6, wherein the processing circuitry to detect the predetermined number of consecutive ones of the monitored samples at the low voltage level without a low-to-high transition comprises the processing circuitry to: sample the flag to obtain samples of the flag; monitor the samples of the flag; and detect a threshold number of consecutive ones of the monitored samples of the flag in which the flag is set, the threshold number of consecutive ones of the monitored samples of the flag corresponding to the predetermined number of consecutive ones of the monitored samples of the voltage level on the SDA line.

Clause 8. The controller of clause 7, wherein the two-wire, shared, serial data bus includes a serial clock (SCL) line for a clock signal, and the processing circuitry is to sample the flag over respective clock periods of a reference clock that has a frequency greater than or equal to the frequency of the clock signal on the SCL line.

Clause 9. The controller of clause 7 or clause 8, wherein the two-wire, shared, serial data bus includes a serial clock (SCL) line for a clock signal, and the processing circuitry is to sample the flag over respective clock periods of a reference clock that has a frequency less than the frequency of the clock signal on the SCL line.

Clause 10. The controller of any of clauses 7 to 9, wherein the processing circuitry is to sample the flag over respective clock periods of a reference clock, and the threshold number of consecutive ones of the monitored samples of the flag is expressed in a predetermined number of the clock periods that is set to equate to a predetermined period of time.

Clause 11. The controller of any of clauses 1 to 10, wherein the processing circuitry to indicate the stuck SDA condition comprises the processing circuitry to generate a stuck SDA status or interrupt to indicate the stuck SDA condition.

Clause 12. The controller of any of clauses 1 to 11, comprising the processing circuitry to perform at least one operation to recover from the stuck SDA condition.

Clause 13. A method comprising: sampling a serial data (SDA) line of a two-wire, shared, serial data bus to obtain samples of a voltage level on the SDA line; monitoring the samples; detecting a predetermined number of consecutive ones of the monitored samples at a low voltage level, without a low-to-high transition in the voltage level; and indicating a stuck SDA condition based on the detected, predetermined number of consecutive ones of the monitored samples.

Clause 14. The method of clause 13, comprising filtering out noise in the voltage level on the SDA line, and wherein the SDA line is sampled from the filtered voltage level.

Clause 15. The method of clause 13 or clause 14, wherein monitoring the samples comprises: monitoring adjacent ones of the samples; detecting a high-to-low transition in the voltage level of the monitored adjacent ones of the samples; and setting a flag based on the detected high-to-low transition, and wherein the predetermined number of consecutive ones of the monitored samples at the low voltage level without the low-to-high transition in the voltage is detected based on the flag.

Clause 16. The method of clause 15, wherein the method comprises holding the flag set for consecutive ones of the monitored samples at the low voltage level.

Clause 17. The method of clause 15 or clause 16, wherein monitoring the samples comprises: detecting a low-to-high transition in the voltage level of the monitored adjacent ones of the samples; and unsetting the flag based on the detected low-to-high transition.

Clause 18. The method of clause 17, comprising holding the flag unset for consecutive ones of the monitored samples at the high voltage level.

Clause 19. The method of any of clauses 15 to 18, wherein detecting the predetermined number of consecutive ones of the monitored samples at the low voltage level without a low-to-high transition comprises: sampling the flag to obtain samples of the flag; monitoring the samples of the flag; and detecting a threshold number of consecutive ones of the monitored samples of the flag in which the flag is set, the threshold number of consecutive ones of the monitored samples of the flag corresponding to the predetermined number of consecutive ones of the monitored samples of the voltage level on the SDA line.

Clause 20. The method of clause 19, wherein the two-wire, shared, serial data bus includes a serial clock (SCL) line for a clock signal, and the flag is sampled over respective clock periods of a reference clock that has a frequency greater than or equal to the frequency of the clock signal on the SCL line.

Clause 21. The method of clause 19 or clause 20, wherein the two-wire, shared, serial data bus includes a serial clock (SCL) line for a clock signal, and the flag is sampled over respective clock periods of a reference clock that has a frequency less than the frequency of the clock signal on the SCL line.

Clause 22. The method of any of clauses 19 to 21, wherein the flag is sampled over respective clock periods of a reference clock, and the threshold number of consecutive ones of the monitored samples of the flag is expressed in a predetermined number of the clock periods that is set to equate to a predetermined period of time.

Clause 23. The method of any of clauses 13 to 22, wherein indicating the stuck SDA condition comprises generating a stuck SDA status or interrupt to indicate the stuck SDA condition.

Clause 24. The method of any of clauses 13 to 23, comprising performing at least one operation to recover from the stuck SDA condition.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A controller comprising:

a serial data (SDA) line interface to connect the controller to an SDA line of a two-wire, shared, serial data bus, wherein the serial data bus comprises a serial clock (SCL) line to provide a clock signal at a first frequency; and processing circuitry to at least:

sample the SDA line, at respective periods having a second frequency less than the first frequency, to obtain samples of a voltage level on the SDA line;

monitor the samples;

detect a predetermined number of consecutive ones of the monitored samples at a low voltage level, without a low-to-high transition in the voltage level; and indicate a stuck SDA condition based on the detected, predetermined number of consecutive ones of the monitored samples.

2. The controller of claim 1, comprising the processing circuitry to filter out noise in the voltage level on the SDA line, and the SDA line is sampled from the filtered voltage level.

3. The controller of claim 1, wherein the processing circuitry to monitor the samples comprises the processing circuitry to:

monitor adjacent ones of the samples;

detect a high-to-low transition in the voltage level of the monitored adjacent ones of the samples; and set a flag based on the detected high-to-low transition, and wherein the predetermined number of consecutive ones of the monitored samples at the low voltage level without the low-to-high transition in the voltage is detected based on the flag.

4. The controller of claim 3, wherein the processing circuitry is to hold the flag set for consecutive ones of the monitored samples at the low voltage level.

5. The controller of claim 3, wherein the processing circuitry to monitor the samples comprises the processing circuitry to:

detect a low-to-high transition in the voltage level of the monitored adjacent ones of the samples; and unset the flag based on the detected low-to-high transition.

6. The controller of claim 5, wherein the processing circuitry is to hold the flag unset for consecutive ones of the monitored samples at the high voltage level.

7. The controller of claim 3, wherein the processing circuitry to detect the predetermined number of consecutive ones of the monitored samples at the low voltage level without a low-to-high transition comprises the processing circuitry to:

sample the flag to obtain samples of the flag;

monitor the samples of the flag; and detect a threshold number of consecutive ones of the monitored samples of the flag in which the flag is set, the threshold number of consecutive ones of the monitored samples of the flag corresponding to the predetermined number of consecutive ones of the monitored samples of the voltage level on the SDA line.

8. The controller of claim 7, wherein the processing circuitry is to sample the flag over respective clock periods of a reference clock that has a frequency less than the frequency of the clock signal on the SCL line.

9. The controller of claim 7, wherein the processing circuitry is to sample the flag over respective clock periods of a reference clock, and the threshold number of consecutive ones of the monitored samples of the flag is expressed in a predetermined number of the clock periods that is set to equate to a predetermined period of time.

10. The controller of claim 1, wherein the processing circuitry to indicate the stuck SDA condition comprises the processing circuitry to generate a stuck SDA status or interrupt to indicate the stuck SDA condition.

11. The controller of claim 1, comprising the processing circuitry to, in response to the stuck SDA condition, hold a voltage level on the SCL line for a period of time, wherein based on a target device's evaluation of the voltage level on the SCL line for the period of time, the target device releases the SDA line.

12. A method comprising:

sampling a serial data (SDA) line of a two-wire, shared, serial data bus to obtain samples of a voltage level on the SDA line, wherein the serial data bus comprises a serial clock (SCL) line to provide a clock signal at a first frequency, and wherein the SDA line is sampled at respective periods having a second frequency less than the first frequency;

monitoring the samples;

detecting a predetermined number of consecutive ones of the monitored samples at a low voltage level, without a low-to-high transition in the voltage level; and indicating a stuck SDA condition based on the detected, predetermined number of consecutive ones of the monitored samples.

13. The method of claim 12, comprising filtering out noise in the voltage level on the SDA line, and wherein the SDA line is sampled from the filtered voltage level.

14. The method of claim 12, wherein monitoring the samples comprises:

monitoring adjacent ones of the samples;

detecting a high-to-low transition in the voltage level of the monitored adjacent ones of the samples; and setting a flag based on the detected high-to-low transition, and wherein the predetermined number of consecutive ones of the monitored samples at the low voltage level without the low-to-high transition in the voltage is detected based on the flag.

15. The method of claim 14, wherein the method comprises holding the flag set for consecutive ones of the monitored samples at the low voltage level.

16. The method of claim 14, wherein monitoring the samples comprises:

detecting a low-to-high transition in the voltage level of the monitored adjacent ones of the samples; and unsetting the flag based on the detected low-to-high transition.

17. The method of claim 16, comprising holding the flag unset for consecutive ones of the monitored samples at the high voltage level.

18. The method of claim 14, wherein detecting the predetermined number of consecutive ones of the monitored samples at the low voltage level without a low-to-high transition comprises:

sampling the flag to obtain samples of the flag;

monitoring the samples of the flag; and detecting a threshold number of consecutive ones of the monitored samples of the flag in which the flag is set, the threshold number of consecutive ones of the monitored samples of the flag corresponding to the predetermined number of consecutive ones of the monitored samples of the voltage level on the SDA line.

19. The method of claim 18, wherein the flag is sampled over respective clock periods of a reference clock that has a frequency less than the frequency of the clock signal on the SCL line.

20. The method of claim 18, wherein the flag is sampled over respective clock periods of a reference clock, and the threshold number of consecutive ones of the monitored samples of the flag is expressed in a predetermined number of the clock periods that is set to equate to a predetermined period of time.

21. The method of claim 12, wherein indicating the stuck SDA condition comprises generating a stuck SDA status or interrupt to indicate the stuck SDA condition.

22. The method of claim 12, comprising, in response to the stuck SDA condition, holding a voltage level on the SCL line for a period of time, wherein based on a target device's evaluation of the voltage level on the SCL line for the period of time, the target device releases the SDA line.

\* \* \* \* \*